(12) United States Patent
Kyo et al.

(10) Patent No.: US 10,302,376 B2
(45) Date of Patent: May 28, 2019

(54) HIGHLY RESISTANT COPPER TUBE AGAINST ANT NEST CORROSION

(71) Applicants: UACJ CORPORATION, Tokyo (JP); UACJ COPPER TUBE CORPORATION, Toyokawa, Aichi (JP)

(72) Inventors: Yoshihiko Kyo, Tokyo (JP); Hirokazu Tamagawa, Toyokawa (JP); Yoshiyuki Oya, Tokyo (JP)

(73) Assignees: UACJ CORPORATION, Tokyo (JP); UACJ COPPER TUBE CORPORATION, Toyokawa (JP)

( * ) Notice: Subject to any disclaimer, the term of this patent is extended or adjusted under 35 U.S.C. 154(b) by 0 days.

(21) Appl. No.: 16/003,912

(22) Filed: Jun. 8, 2018

(65) Prior Publication Data

US 2018/0313616 A1 Nov. 1, 2018

Related U.S. Application Data

(63) Continuation of application No. PCT/JP2017/040549, filed on Nov. 10, 2017.

(30) Foreign Application Priority Data

Apr. 27, 2017 (JP) .................................. 2017-087927

(51) Int. Cl.
*F28F 1/00* (2006.01)
*F28F 19/00* (2006.01)
(Continued)

(52) U.S. Cl.
CPC ................ *F28F 19/00* (2013.01); *C22C 9/00* (2013.01); *B21C 23/002* (2013.01); *B21C 23/085* (2013.01); *F16L 9/02* (2013.01)

(58) Field of Classification Search
CPC ..... F28F 19/00; C22C 9/00; F16L 9/02; B29B 13/022; B29C 67/0055; B33Y 40/00; B21C 1/003; B21C 23/002; B21C 23/085
(Continued)

(56) References Cited

U.S. PATENT DOCUMENTS 4,430,295 A * 2/1984 Jandeska, Jr. ....... C22C 33/0214
419/46
6,342,306 B1 * 1/2002 Ozawa .................... B22F 7/004
384/902

(Continued)

FOREIGN PATENT DOCUMENTS

JP S63-26319 A 2/1988
JP H07-90428 A 4/1995
(Continued)

OTHER PUBLICATIONS

Feb. 13, 2018 Written Opinion of International Searching Authority issued in International Application No. PCT/JP2017/040549.

*Primary Examiner* — Davis D Hwu
(74) *Attorney, Agent, or Firm* — Oliff PLC

(57) ABSTRACT

Provided is a corrosion resistant copper tube which can exhibit a further improved resistance to ant nest corrosion, and which is suitably usable as a heat transfer tube and refrigerant tube in air-conditioning equipment and refrigerating equipment. The copper tube is formed of a copper material comprising a copper alloy consisting of 0.15-0.50% by weight of phosphorus and the balance being copper and impurities, wherein the copper material includes phosphorus oxide particles, such that a number density of particles having a circle equivalent diameter of not less than 0.1 μm among the phosphorus oxide particles is not more than $50000/\text{mm}^2$.

10 Claims, 1 Drawing Sheet

(51) Int. Cl.
*C22C 9/00* (2006.01)
*F16L 9/02* (2006.01)
*B21C 23/08* (2006.01)
*B21C 23/00* (2006.01)

(58) Field of Classification Search
USPC .......................................................... 165/177
See application file for complete search history.

(56) References Cited

U.S. PATENT DOCUMENTS

2004/0071374 A1* 4/2004 Tomita ................ F16Q 32/0603
384/100
2011/0056596 A1* 3/2011 Oishi ...................... B21C 1/003
148/680
2015/0377568 A1 12/2015 Kawano et al.

FOREIGN PATENT DOCUMENTS

| JP | H07-166275 A | 6/1995 |
| JP | H07-166276 A | 6/1995 |
| JP | 2014-118580 A | 6/2014 |
| WO | 2014/148127 A1 | 9/2014 |

* cited by examiner

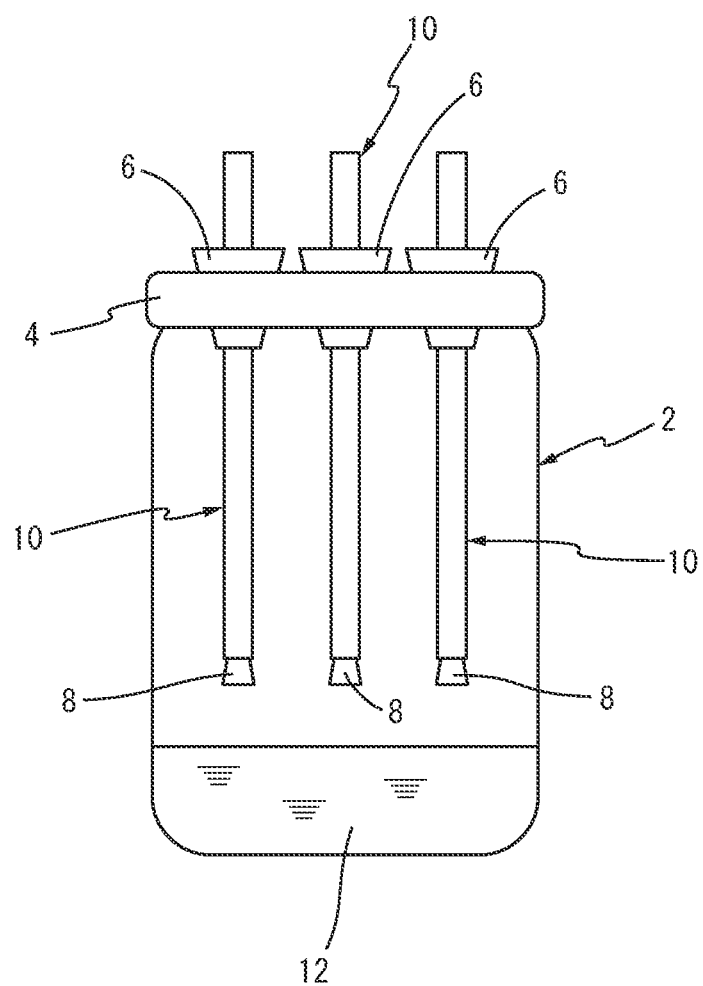

US 10,302,376 B2

HIGHLY RESISTANT COPPER TUBE AGAINST ANT NEST CORROSION

This application is a continuation of the International Application No. PCT/JP2017/040549 filed on Nov. 10, 2017, the entireties of which are incorporated herein by reference.

BACKGROUND OF THE INVENTION

Field of the Invention

The present invention relates to a copper tube which is highly resistant to ant nest corrosion (or formicary corrosion), and more particularly relates to a technique of improving resistance of the copper tube against ant nest corrosion, which copper tube is suitably usable as a heat transfer tube and a refrigerant tube in air-conditioning equipment and refrigerating equipment, for example.

Description of Related Art

As the heat transfer tube, the refrigerant tube and the like (tubes arranged inside desired equipment), which are used, for example, in the air-conditioning equipment and the refrigerating equipment, a tube made of a phosphorous deoxidized copper (JIS-H3300-C1220) having excellent properties in terms of corrosion resistance, brazeability, heat conductivity and bending workability, for example, has been mainly used.

However, it is recognized that the above-described phosphorous deoxidized copper tube used in the air-conditioning equipment and the refrigerating equipment suffers from generation of so-called "ant nest corrosion" or "formicary corrosion" which is an unusual corrosion that progresses in the form of an ants' nest from a surface of the tube in a direction of the wall thickness. The ant nest corrosion is considered to be generated in a damp environment by a corrosive medium in the form of a lower carboxylic acid such as a formic acid and an acetic acid. Further, it is recognized that such corrosion is also generated in the presence of a chlorine-based organic solvent such as 1,1,1-trichloroethane, particular kinds of lubricating oil, and formaldehyde, for example. It is known that generation of the ant nest corrosion is particularly remarkable where the phosphorous deoxidized copper tube is used as a conduit in the air-conditioning equipment and the refrigerating equipment, which conduit is liable to dewing. Once the ant nest corrosion is generated, it progresses rapidly and penetrates through the wall of the copper tube in a short time, thereby giving rise to a problem that the equipment becomes unworkable.

To solve the above-described problems, WO2014/148127 proposes a highly corrosion-resistant copper tube formed of a copper material comprising 0.05-1.0% by weight of P (phosphorus) and the balance consisting of Cu (copper) and inevitable impurities, and discloses that the copper tube enjoys improved resistance to the ant nest corrosion. More particularly, it indicates that a copper tube having a higher resistance to the ant nest corrosion than that of the conventional tube material made of the phosphorous deoxidized copper, in an area with a larger P content, can be practically advantageously obtained.

However, even the copper tube obtained with an increased P content may suffer from generation of the ant nest corrosion under a severer corrosive environment. Therefore, it is desired to develop a copper tube which can exhibit an even higher resistance to the ant nest corrosion than the above-described copper tube obtained with an increased P content.

Patent Document 1: WO2014/148127

SUMMARY OF THE INVENTION

The present invention was made in view of the background art described above. It is therefore a technical problem of the invention to provide a highly corrosion-resistant copper tube which can exhibit a higher resistance to the ant nest corrosion, and which is suitably usable as the heat transfer tube and the refrigerant tube in the air-conditioning equipment and the refrigerating equipment. It is another problem of the invention to advantageously extend a service life of equipment produced by using such a copper tube.

The inventors of the present invention made further intensive studies on the ant nest corrosion generated in the copper tube used in the air-conditioning equipment, the refrigerating equipment and the like, and found that the corrosion resistance of the copper tube can be further improved by controlling a number density of particles which are included in a copper tube material containing P in a ratio of 0.15-0.50% by weight and have a circle equivalent diameter of not less than 0.1 μm among phosphorus oxide particles, such that the number density is not higher than a specific value. The present invention was completed based on this finding.

Based on the above-described finding, the present invention provides a copper tube which is highly resistant to ant nest corrosion and which is formed of a copper material comprising a copper alloy consisting of 0.15-0.50% by weight of phosphorus and the balance being copper and impurities, wherein the copper material includes phosphorus oxide particles, such that the number density of particles having a circle equivalent diameter of not less than 0.1 μm among the phosphorus oxide particles is not more than 50000/mm$^2$.

in one preferable form of the copper tube according to the invention, a content of a group of specific impurity elements consisting of Cr (chromium), Mn (manganese), Fe (iron), Co (cobalt), Zr (zirconium) and Mo (molybdenum) among the impurities is controlled so as to be not higher than 0.01% by weight in total, whereby an even higher corrosion resistance to the ant nest corrosion can be achieved.

In another preferable form of the copper tube which is highly resistant to ant nest corrosion according to the invention, a content of inevitable impurity elements other than the group of the specific impurity elements among the impurities is controlled so as to be not higher than 0.005% by weight in total, In a further preferable form of the copper tube which is highly resistant to ant nest corrosion according to the invention, the tube is arranged in a damp environment and subjected to corrosion that progresses in the form of an ants' nest from a surface of the tube in a direction of a wall thickness of the tube by a corrosive medium in the form of a lower carboxylic acid.

The present invention also provides a process for producing the copper tube which is highly resistant to ant nest corrosion, comprising: a step of melting a copper source material to obtain a melted copper source material; a step of adding a phosphorus source material to the melted copper source material in a plurality of separate additions so as to prepare a copper molten metal containing phosphorus in said amount; a step of casting the copper molten metal to obtain a billet; and a step of hot-extruding the billet to produce a tube.

In a preferable form of the process for producing the copper tube according to the invention, an amount of a first addition of the phosphorus source material among the plurality of separate additions is determined such that phosphorus is contained in the copper molten metal in a ratio of 0.015-0.040% by weight.

In another preferable form of the process for producing the copper tube according to the invention, preparation of the copper molten metal and casting of the billet are performed in an atmosphere of an inert gas or a reducing gas.

The present invention also provides a heat transfer tube and a refrigerant tube (tubes arranged inside desired equipment) which are used in air-conditioning equipment or refrigerating equipment, each of which consists of the copper tube that is excellent in the resistance to ant nest corrosion, as described above.

Furthermore, the present invention provides a method of improving corrosion resistance of a copper tube against ant nest corrosion which is generated by a corrosive medium in the form of a lower carboxylic acid in a damp environment and progresses from the surface of the copper tube used for air-conditioning equipment or refrigerating equipment in the damp environment, wherein the copper tube is formed of a copper material comprising a copper alloy consisting of 0.15-0.50% by weight of phosphorus and the balance being copper and impurities; and wherein the copper material includes phosphorus oxide particles, such that a number density of particles having a circle equivalent diameter of not less than 0.1 μm among the phosphorus oxide particles is not more than 50000/mm$^2$.

According to the present invention, a practically useful copper tube which exhibits a more excellent corrosion resistance than that of the conventional copper tube with respect to the resistance to the ant nest corrosion can be provided. In addition, by employing the copper tube as a heat transfer tube, a refrigerant tube (tubes arranged inside desired equipment) and the like which are used in air-conditioning equipment or refrigerating equipment, the service life of the equipment can be effectively improved.

BRIEF DESCRIPTION OF THE DRAWINGS

FIG. 1 is a schematic cross sectional view showing an apparatus used for a corrosion resistance test of the tube in illustrated examples.

DETAILED DESCRIPTION OF THE INVENTION

The present invention has a remarkable feature that a copper tube highly resistant to the ant nest corrosion according to the invention is formed of a copper material which has a phosphorus (P) content held within a range of 0.15-0.50% by weight and includes phosphorus (P) oxide particles, and that a number density of particles having a circle equivalent diameter of not less than 0.1 μm among the phosphorus oxide particles is controlled to be not more than 50000/mm$^2$. By adding a high concentration of P and controlling the number density of the P oxide particles having a size not smaller than a predetermined value, the type of corrosion generated in the copper tube shifts from the ant nest corrosion to a general corrosion (whole-surface corrosion) or a pitting corrosion so that the resistance to the ant nest corrosion is further improved even under a severer corrosive environment, whereby the copper tube can exhibit a corrosion resistance which is considerably higher than that of the conventional copper tube for a long period of time.

However, the P content of the copper tube is set so as to be not lower than 0.15% by weight, because in the case where the P content of the copper tube is lower than 0.15% by weight, a localized corrosion which progresses in the form of the ants' nest is likely to be generated. On the other hand, the P content of more than 0.50% by weight does not permit a substantially effective improvement in the resistance of the copper tube against the ant nest corrosion, and even causes deterioration of workability of the copper tube during production, thereby giving rise to a problem of cracking of the copper tube, for example. For this reason, the upper limit of the P content needs to be 0.50% by weight.

In the copper tube highly resistant to the ant nest corrosion according to the invention, in the case where the number density of the particles which are included in the Cu tube material and have the circle equivalent diameter of not less than 0.1 μm among the P oxide particles is more than 50000/mm$^2$, the localized corrosion which progresses in the form of the ants' nest is likely to be generated under a severer corrosive environment. Therefore, according to the invention, the number density of the P oxide particles included in the Cu tube material and having the circle equivalent diameter of not less than 0.1 μm is controlled to be not more than 50000/mm$^2$.

In the present invention, the reason why the corrosion resistance is increased by controlling the number density of the P oxide particles having a size not smaller than a predetermined value such that the number density is not higher than a specific value is presently considered as follows. That is, in the copper tube having an increased P content according to the invention, P included in the copper tube material is dissolved by the reaction with water in the environment to generate phosphoric acids such as orthophosphoric acid and polyphosphoric acid (hereinafter referred simply as phosphoric acids) upon exposure of the copper tube to a corrosive environment. Since the generated phosphoric acids have an effect of suppressing the ant nest corrosion, it is quite important, for improvement of the resistance of the copper tube against the ant nest corrosion, to permit effective generation of phosphoric acids in the copper tube upon exposure to the corrosive environment. However, when P included in the copper tube material is oxidized to form a particulate of the phosphorus oxide in the form of $P_2O_5$ and the like, the effect of improvement of the corrosion resistance cannot be sufficiently exhibited. In particular, the existence of the P oxide particles has an adverse influence on the effect of improvement of the corrosion resistance in the case where the number density of the P oxide particles included in the Cu tube material and having the circle equivalent diameter of not less than 0.1 μm is more than 50000/mm$^2$. Namely, in that case, a considerable amount of P existing in the copper material of the tube is changed into the P oxide and is thus consumed, so that unevenness of distribution of the P concentration in the matrix phase is increased. Furthermore, the P oxide particles themselves serve as a starting point of corrosion and an accelerator of propagation of the corrosion, thereby causing deterioration of the corrosion resistance. Thus, it is considered that the effect of improvement of the resistance to the ant nest corrosion is exhibited by suitably controlling the number density of the P oxide particles in the copper tube.

In production of the desired copper tube by using a Cu source material to attain a composition according to the invention, the copper tube is produced by subjecting, for example, a cast body such as an ingot or a billet formed of the Cu source material corresponding to the above-described composition to conventional processes such as casting, homogenization treatment, hot extrusion, rolling, drawing and annealing. The cast body is formed as described below.

To meet the requirement that the number density of the P oxide particles included in the Cu tube material and having the circle equivalent diameter of not less than 0.1 μm among the phosphorus oxide particles is not more than 50000/mm$^2$, it is preferable that in a casting process, which is a main source of generation of the P oxide particles, a series of steps from melting to solidifying of the Cu source material is performed in an atmosphere of a non-oxidizing gas such as an inert gas and a reducing gas, in particular, the reducing gas. Furthermore, to remove O (oxygen) from the melted Cu source material (molten metal), addition of the P source material to the melted Cu source material is preferably performed in two separate batches. Here, the amount of a first addition of the P source material to the melted Cu source material is adjusted such that P is contained in the melted Cu source material in a ratio of about 0.015-0.040% by weight, for the purpose of deoxidizing the melted Cu source material. Subsequently, the remaining P source material is added to the melted Cu source material so that the melted Cu source material includes the predetermined amount of P to obtain a Cu molten metal having the composition according to the invention. Thus, it is possible to advantageously obtain the copper tube material wherein O (oxygen) is effectively removed from the melted Cu source material (molten metal) by the reaction with P in the melted Cu source material, which reaction generates the P oxide, and wherein the desired P content is achieved at the same time.

The copper tube highly resistant to the ant nest corrosion according to the invention is formed of a copper material comprising a copper alloy consisting of the above-described amount of P and the balance being Cu and impurities. In the invention, a content of a group of specific impurity elements consisting of Cr, Mn, Fe, Co, Zr and Mo, among the impurities, is controlled so as to be not higher than 0.01% by weight in total, so that the corrosion resistance of the copper tube is further improved. It is because the group of the specific impurity elements is likely to form a compound with P by annealing or other heat treatments, resulting in deterioration of the corrosion resistance of the copper tube due to a generated P-based precipitation.

Furthermore, as the impurities contained with Cu in the copper tube material, there are inevitable impurities such as S, Si, Ti, Ag, Pb, Se, Te, Bi, Sn, Sb and As in addition to the above-described group of the specific impurity elements. The total amount of the inevitable impurities is preferably controlled so as to be not higher than 0.005% by weight.

As the Cu source material in which a content of the above-described group of the specific impurity elements and other inevitable impurity elements is reduced, a commercially pure copper whose purity is increased by a conventional smelting technique, such as an electrolytic copper obtained by increasing the purity so as to include not lower than 99.99% by weight of Cu, is advantageously used.

Sizes such as an outside diameter and a thickness of the copper tube obtained according to the invention as described above are suitably set according to the use of the copper tube. In the case where the copper tube according to the invention is used as the heat transfer tube, the copper tube may have smooth (or non-grooved) inner and outer surfaces. Alternatively, the heat transfer tube may advantageously have internal or external grooves (projections) of various shapes formed by various known internal or external working. When the copper tube is used as the refrigerant tube, the refrigerant tube generally has smooth inner and outer surfaces.

The above-described copper tube according to the invention is advantageously used as a heat transfer tube or refrigerant tube in air-conditioning equipment, and also as a heat transfer tube or refrigerant tube (tubes arranged inside desired equipment) in refrigerating equipment.

EXAMPLES

To clarify the present invention more specifically, some examples according to the present invention will be described. It is to be understood that the invention is by no means limited by details of the illustrated examples, but may be embodied with various changes, modifications and improvements which are not described herein, and which may occur to those skilled in the art, without departing from the spirit of the invention.

First, a casting process of various billets for extrusion corresponding to copper tubes Nos. 1-9 was performed so as to obtain the copper tubes, each of which has a composition having a P content indicated in Table 1 given below and the balance consisting of Cu and impurities. In the casting process, a P source material was added to a melted Cu source material in two separate batches in a ratio indicated in Table 1, so as to control a number density of particles included in the material of the copper tubes and having a circle equivalent diameter of not less than 0.1 μm among the phosphorus oxide particles such that the number density is not more than 50000/mm$^2$. In the casting process of the billets for extrusion corresponding to the copper tubes Nos. 6 and 8, a series of steps from melting to solidifying was performed in an atmosphere of the air, while in the casting process of the billets for extrusion corresponding to the rest of the copper tubes, a series of steps from melting to solidifying was performed in an atmosphere of an inert gas comprising the nitrogen gas. Thus, the desired billets for extrusion were produced. Furthermore, in production of each of the billets corresponding to the copper tubes Nos. 1-6, 8 and 9, the first addition of the P source material to the melted Cu source material was performed for the purpose of deoxidization such that P was included in the obtained Cu molten metal in a ratio of 0.016-0.036% by weight. Then, the second addition of the P source material in a ratio indicated in Table 1 was performed to achieve the predetermined concentration of P, to thereby obtain the billet for extrusion having the desired P content. In production of the billet corresponding to the copper tube No. 7, only the first addition of the P source material was performed so as to obtain the billet for extrusion having the desired concentration of P. Subsequently, after the casting process, the billets for extrusion were subjected to the conventional working processes such as hot extrusion and drawing of the tube, so that the various copper tubes having an outside diameter of 7.00 mm and a thickness of the tube (wall thickness of the tube) of 0.25 mm were produced.

To calculate a content of impurities in the copper tubes Nos. 1-8, each copper tube was dissolved into an acid (aqua regia) and analyzed by a high-frequency inductively coupled plasma optical emission spectrometric analysis method (ICP-CUES) with respect to contents of elements included as the impurities in the tube. As a result, it was confirmed with respect to all of the copper tubes that the total content of the group of the specific impurity elements (Cr, Mn, Fe, Co, Zr and Mo) was less than 0.01% by weight, and also the total content of the inevitable impurities other than the group of the specific impurity elements was less than 0.005% by weight.

The number density of the P oxide particles included in each copper tube was calculated by using an electron microscope as follows. That is, with respect to a transverse cross section perpendicular to the axis of the tube, a central part in a direction of the wall thickness of the tube was observed. An observation field was set to be 25 μm×25 μm, and the number of the particulate crystallized products (P oxide particles) having the circle equivalent diameter of not less than 0.1 μm existing in the observation field was counted. This measurement was made at 8 points in the same transverse cross section defined at angular intervals of 45° starting from an arbitrary point. The measurement was made in three transverse cross sections in total, As such, with respect to each copper tube, the number of the P oxide particles was counted in 24 observation fields in total, and an arithmetic mean of the obtained number was converted into a value per 1 mm$^2$, which value is shown in Table 1 given below. It is noted that optimization of the cross sections to be observed in each copper tube was performed by grinding with a cross section polisher used as a grinder, It is noted that the copper tube No. 9 was made of a Cu material containing an excessive amount of P, so that the tube suffered from deficiencies such as a crack during tube-making, and a copper tube to be subjected to the corrosion test could not be obtained. Thus, the desired corrosion test could not be performed.

TABLE 1

| Copper tube | | P content (% by weight) | Method of addition of P | | Number density of P$_2$O$_5$ (number/ mm$^2$) |
|---|---|---|---|---|---|
| | | | Amount of first addition (% by weight)* | Amount of second addition (% by weight)* | |
| No. | Kind | | | | |
| 1 | Example | 0.16 | 0.027 | 0.14 | 119 |
| 2 | Example | 0.21 | 0.036 | 0.18 | 3541 |
| 3 | Example | 0.24 | 0.018 | 0.23 | 7448 |
| 4 | Example | 0.29 | 0.017 | 0.28 | 34508 |
| 5 | Example | 0.37 | 0.019 | 0.35 | 19865 |
| 6 | Example | 0.46 | 0.020 | 0.44 | 47644 |
| 7 | Comparative Example | 0.03 | 0.033 | — | 189 |
| 8 | Comparative Example | 0.31 | 0.016 | 0.30 | 52736 |
| 9 | Comparative Example | 0.54 | 0.035 | 0.51 | — |

*Represented by the content in the Cu molten metal

Subsequently, each of the thus prepared copper tubes was subjected to an ant nest corrosion test by using a test apparatus shown in FIG. 1. In FIG. 1, a reference numeral 2 represents a plastic container which has a capacity of 2 L and which can be hermetically sealed with a cap 4. Silicone plugs 6 are attached to the cap 4 such that the plugs 6 extend through the cap 4. Copper tubes 10 are inserted into the plastic container 2 by a predetermined length, such that the copper tubes 10 extend through the respective silicone plugs 6. Lower open ends of the copper tubes 10 are closed with silicone plugs 8. In this case, the length of the copper tubes is 18 cm, and the length of the portion exposed to the inside of the plastic container is 15 cm. Furthermore, 100 mL of a formic acid aqueous solution having a predetermined concentration is accommodated in the plastic container 2, such that the copper tubes 10 do not contact with the aqueous solution.

In the ant nest corrosion test, three kinds of formic acid aqueous solutions 12 whose concentrations were respectively set to be 0.01%, 0.1% and 1%, were prepared. The copper tubes 10 were set in the plastic container 2 in which each kind of the formic acid aqueous solutions 12 was accommodated, and the plastic container 2 was left within a constant temperature bath at a temperature of 40° C. The plastic container 2 with the copper tubes 10 was taken out of the bath and left for two hours at room temperature (15° C.) each day, to cause dewing on surfaces of the copper tubes 10 due to a difference between the temperature of the constant temperature bath and the room temperature. The copper tubes 10 were subjected to the corrosion test under the above-described conditions for 80 days.

Each of the copper tubes subjected to the corrosion test was examined with respect to 5 arbitrary points of the cross section perpendicular to the axis of the tube, which cross section was taken in a portion of each copper tube which was exposed to the inside of the plastic container 2 in FIG. 1. Then, each of the copper tubes was measured of the maximum corrosion depth from the outer surface of the tube. Results of the measurement are evaluated in four grades, and indicated in Table 2 given below according to the concentration of the formic acid aqueous solution. The evaluation standard is as follows: the tube whose maximum corrosion depth was less than 0.1 mm is evaluated as Excellent; the tube whose maximum corrosion depth was not less than 0.1 mm and less than 0.2 mm is evaluated as Good; the tube whose maximum corrosion depth was not less than 0.2 mm is evaluated as Average; and the tube which suffered from penetration is evaluated as Poor.

TABLE 2

| | Maximum corrosion depth | | |
|---|---|---|---|
| Copper tube No. | Concentration of formic acid: 0.01% | Concentration of formic acid: 0.1% | Concentration of formic acid: 1% |
| 1 | Excellent | Good | Good |
| 2 | Excellent | Excellent | Excellent |
| 3 | Excellent | Excellent | Excellent |
| 4 | Excellent | Excellent | Excellent |
| 5 | Excellent | Excellent | Excellent |
| 6 | Excellent | Excellent | Good |
| 7 | Average | Poor | Poor |
| 8 | Excellent | Good | Average |
| 9 | — | — | — |

As is apparent from the results indicated in Table 2, in the corrosion test using the formic acid aqueous solution having the concentration of 0.01%, any of the copper tubes Nos. 1-6 in which the P content is within the range of 0.15-0.50% by weight and the number density of the P oxide particles whose circle equivalent diameter is not less than 0.1 μm is not more than 50000/mm$^2$ did not suffer from the ant nest corrosion, and merely had a slight corrosion generated on the outer surface of the tube. Furthermore, in the corrosion test using the formic acid aqueous solutions having the concentration of 0.1% and 1%, any of the copper tubes Nos. 1-6 suffered from a certain degree of corrosion, but the cross section of the affected portion was not in the form of the ant nest corrosion. It was recognized that the maximum corrosion depth of the copper tubes 1-6 was significantly suppressed in comparison with that of the copper tubes Nos. 7 and 8, which are the Comparative Examples.

On the contrary, the copper tube No. 7 (Comparative Example) having a P content outside the range of the invention suffered from a deep ant nest corrosion in any of the test condition, and in the ant nest corrosion test using the 0.1% and 1% formic acid aqueous solutions, a remarkable ant nest corrosion was generated to cause penetration through the tube walls. Furthermore, the copper tube 8 (Comparative Example) in which a P content was held within the range of the invention but the number density of the P oxide particles having a large circle equivalent diameter was outside the range of the invention suffered from a deep corrosion in the corrosion test using the 0.1% and 1% formic acid aqueous solutions, so that it was recognized that the copper tube 8 was inferior to the copper tubes Nos. 1-6 with respect to the corrosion resistance.

| NOMENCLATURE OF REFERENCE SIGNS | |
|---|---|
| 2: Plastic container | 4: Cap |
| 6: Silicone plugs | 8: Silicone plugs |
| 10: Copper tubes | 12: Formic acid aqueous solution |

The invention claimed is:

1. A copper tube which is highly resistant to ant nest corrosion and which is formed of a copper material comprising a copper alloy consisting of 0.15-0.50% by weight of phosphorus and the balance being copper and impurities, wherein the copper material includes phosphorus oxide particles, such that a number density of particles having a circle equivalent diameter of not less than 0.1 μm among the phosphorus oxide particles is not more than 50000/mm$^2$.

2. The copper tube which is highly resistant to ant nest corrosion according to claim 1, wherein a content of a group of specific impurity elements consisting of Cr, Mn, Fe, Co, Zr and Mo among the impurities is not higher than 0.01% by weight in total.

3. The copper tube which is highly resistant to ant nest corrosion according to claim 2, wherein a content of inevitable impurity elements other than the group of the specific impurity elements among said impurities is not higher than 0.005% by weight in total.

4. The copper tube which is highly resistant to ant nest corrosion according to claim herein the tube is arranged in a damp environment and subjected to corrosion that progresses in the form of an ants' nest from a surface of the tube in a direction of a wall thickness of the tube by a corrosive medium in the form of a lower carboxylic acid.

5. A process for producing the copper tube which is highly resistant to ant nest corrosion according to claim 1, comprising:
   a step of melting a copper source material to obtain a melted copper source material;
   a step of adding a phosphorus source material to the melted copper source material in a plurality of separate additions, so as to prepare a copper molten metal containing phosphorus in said amount;
   a step of casting the copper molten metal to obtain a billet; and
   a step of hot-extruding the billet to produce a tube.

6. The process for producing the copper tube according to claim 5, wherein an amount of a first addition of the phosphorus source material among the plurality of separate additions is determined such that phosphorus is contained in the copper molten metal in a ratio of 0.015-0.040 by weight.

7. The process for producing the copper tube according to claim 5, wherein preparation of the copper molten metal and casting of the billet are performed in an atmosphere of an inert gas or a reducing gas.

8. A heat transfer tube for air-conditioning equipment or refrigerating equipment, consisting of the copper tube which is highly resistant to ant nest corrosion according to claim 1.

9. A refrigerant tube for air-conditioning equipment or refrigerating equipment, consisting of the copper tube which is highly resistant to ant nest corrosion according to claim 1.

10. A method of improving corrosion resistance of a copper tube against ant nest corrosion which is generated by a corrosive medium in the form of a lower carboxylic acid in a damp environment and progresses from a surface of the copper tube used for air-conditioning equipment or refrigerating equipment in the damp environment, wherein:
   the copper tube is formed of a copper material comprising a copper alloy consisting of 0.15-0.50% by weight of phosphorus and the balance being copper and impurities; and wherein
   the copper material includes phosphorus oxide particles, such that a number density of particles having a circle equivalent diameter of not less than 0.1 μm among the phosphorus oxide particles is not more than 50000/mm$^2$.

* * * * *